United States Patent

Sugio (10) Patent No.: US 8,763,355 B2
(45) Date of Patent: Jul. 1, 2014

(54) MOWER UNIT UTILIZING REMOVABLY ATTACHAMBLE PULLEY COVER

(71) Applicant: Kubota Corporation, Osaka (JP)

(72) Inventor: Akihito Sugio, Norcross, GA (US)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/656,928

(22) Filed: Oct. 22, 2012

(65) Prior Publication Data

US 2014/0109538 A1 Apr. 24, 2014

(51) Int. Cl.
*A01D 34/52* (2006.01)
*A01D 34/73* (2006.01)

(52) U.S. Cl.
USPC .......................................................... 56/255

(58) Field of Classification Search
USPC ................... 56/255, 17.4; 474/146, 150, 144; 417/313; 361/679.01
See application file for complete search history.

(56) References Cited

U.S. PATENT DOCUMENTS

| 4,361,001 A * | 11/1982 | Almond et al. ............... 56/12.8 |
| 5,601,504 A * | 2/1997 | Rocca et al. ................... 474/91 |
| 5,957,796 A * | 9/1999 | McLean ....................... 474/146 |
| 6,434,918 B1 * | 8/2002 | Csonka et al. ................. 56/13.4 |
| 6,646,892 B1 * | 11/2003 | Hsu ............................... 361/818 |
| 7,735,305 B1 | 6/2010 | Cozine et al. |
| 2004/0164192 A1* | 8/2004 | Chang .......................... 241/100 |
| 2011/0222212 A1* | 9/2011 | Xiao et al. ............... 361/679.01 |

FOREIGN PATENT DOCUMENTS

| CN | 201973216 U | * | 9/2011 | ............. F16H 57/02 |
| JP | 2003154980 A | * | 5/2003 | ................. B62J 9/00 |

* cited by examiner

*Primary Examiner* — Árpád Fábián-Kovács
(74) *Attorney, Agent, or Firm* — Greenblum and Bernstein, P.L.C.

(57) ABSTRACT

A cover having a side skirt and an upper face part covers a pulley provided to a mower deck. A latch mechanism removably attaches the cover to a top plate of the mower deck using an elastic deformation of the cover. The latch mechanism includes a first bracket forming a first opening, and a second bracket which is provided to the top plate so as to oppose to the first bracket via the pulley, and forms at least one second opening, a first projection provided to the side skirt of the cover, and for engaging with the first opening when attaching the cover, and at least one second projection provided to the side skirt of the cover, and for engaging with the second opening when attaching the cover.

20 Claims, 7 Drawing Sheets

MOWER UNIT UTILIZING REMOVABLY ATTACHAMBLE PULLEY COVER

TECHNICAL FIELD

The present invention generally relates to a protective cover for a power transmission pulley provided to a mower deck of a mower unit that is mounted to an engine-powered mower.

BACKGROUND ART

U.S. Pat. No. 7,735,305B1 discloses a removable cover covering a pulley rotatably supported through bearings on a top plate of a mower deck. Two rail brackets extending in front-and-rear directions and an arch-shaped anchor are provided standing from the top plate of the mower deck. The cover has an upper face part and a side skirt. An opening which receives the anchor is formed in the upper face part, and a lip to be engaged with the anchor is formed in an edge of the opening. In addition, tabs to be engagingly inserted into slots formed in the rails are provided in the end of the side skirt of the cover. That is, when attaching the cover to the mower deck, the lip is engaged with the anchor and the tabs engage with the slots, thereby achieving a latch connection between the mower deck and the cover. Since the cover is made from an elastic material, the engagement between the lip and the anchor can be released by pressing down the lip which is a cantilever shape and, therefore, a removal of the cover from the mower deck is possible. This cover allows quick and easy removal and attachment of itself from/to the mower deck, without using any fasteners and/or tools which are separately provided from the cover. However, since the lip to be engaged with the anchor is arranged on the upper surface of the cover which allows a free access from above, when the a pressing force acts unintentionally from above at the engaged part, the engagement between the anchor and the lip may possibly be released.

For this reason, a cover which can provide a more effective engagement with the mower deck is desired.

SUMMARY OF INVENTION

According to one aspect of the present invention, a mower unit to be attached to an engine-powered mower includes a rotary blade, a mower deck covering the rotary blade, a drive shaft penetrating a top plate of the mower deck, and a pulley type power transmission device for transmitting power from an engine to the drive shaft. The drive shaft has a lower part located below the top plate, and an upper part located above the top plate. A rotary blade is attached to the lower part. The pulley type power transmission device includes a pulley attached to the upper part of the drive shaft. The mower unit also includes a cover having a side skirt and an upper face part, covering the pulley, and a latch mechanism for removably attaching the cover onto the upper surface of the top plate using an elastic deformation of the cover. The latch mechanism includes a first bracket provided to the top plate and formed with at least one first opening, a second bracket provided to the top plate so as to oppose to the first bracket via the pulley and formed with at least one second opening, at least one first projection provided to the side skirt of the cover, and for engaging with the first opening when attaching the cover, and at least one second projection provided to the side skirt of the cover, and for engaging with the second opening when attaching the cover.

With this configuration, the first projection provided in the side skirt of the cover engages with the first opening formed in the first bracket, and the second projection provided to the side skirt of the cover engages with the second opening formed in the second bracket. Thus, the cover achieves a latch connection with the first bracket and the second bracket of the cover, that is, as a result, the cover achieves a latch connection with the mower unit. Therefore, the cover is attached to the mower unit in position. In this configuration, since the latch connection part is located in the side skirt of the cover, even if a force acts unintentionally from above on the upper surface of the cover, the force does not directly reach the latch connection part (the first projection and the first opening; the second projection and the second opening). Therefore, an unexpected latch disengagement can be prevented.

The cover comprised only of the upper face part and the side skirt has a deep dish shape. In this case, if the cover is formed thin in consideration of its weight or material cost, the cover is easily deformed by the force acting from above, and the upper face part may sometimes contact the pulley. In order to avoid this problem, in one preferable embodiment of the present invention, the first rib and the second rib are formed extending downwardly from the upper face part of the cover, and the lower end surfaces of the first rib and the second rib function as the attaching surfaces which contact the surface of the top plate when the cover is attached. With this configuration, the force acting from above can be received by the first rib and the second rib and, thereby suppressing the deformation of the upper face part minimum. In addition, since the lower end surfaces of the first rib and the second rib are used as the attaching surfaces to the top plate of the mower deck, a stabilized attaching state of the cover can be acquired.

In one preferable embodiment of the present invention, the upper face part of the cover has a plate shape, and by using the elastic deformation of the upper face part of the cover, the first projection enters into the first opening from the surface of the first bracket on the pulley side, and the second projection enters into the second opening from the surface of the second bracket on the pulley side. In this case, it is preferable to determine the length of the side skirt such that, when the cover is attached where the lower end surfaces of the first rib and the second rib contact the upper face part, a gap is formed between the lower end surface of the side skirt and the top plate of the motor deck. Thus, a free motion of the side skirt associated with the elastic deformation of the upper face part is secured, and the entering and exiting of the first projection and the second projection into/from the first opening and the second opening, respectively, becomes easy.

In order to effectively utilize the elasticity of the cover, one preferable embodiment according to the present invention is configured so that, by the elastic deformation of the upper face part of the cover due to the downward load acting on the upper face part of the cover, the displacement of the first projection entering into the first opening is further caused, and the displacement of the second projection entering into the second opening is caused. With this configuration, the displacement widening the side skirt caused by the force acting on the upper face part of the cover from above further strengthens the entering of the first projection into the first opening and the entering of the second projection into the second opening.

DESCRIPTION OF EMBODIMENT

Figure 1:
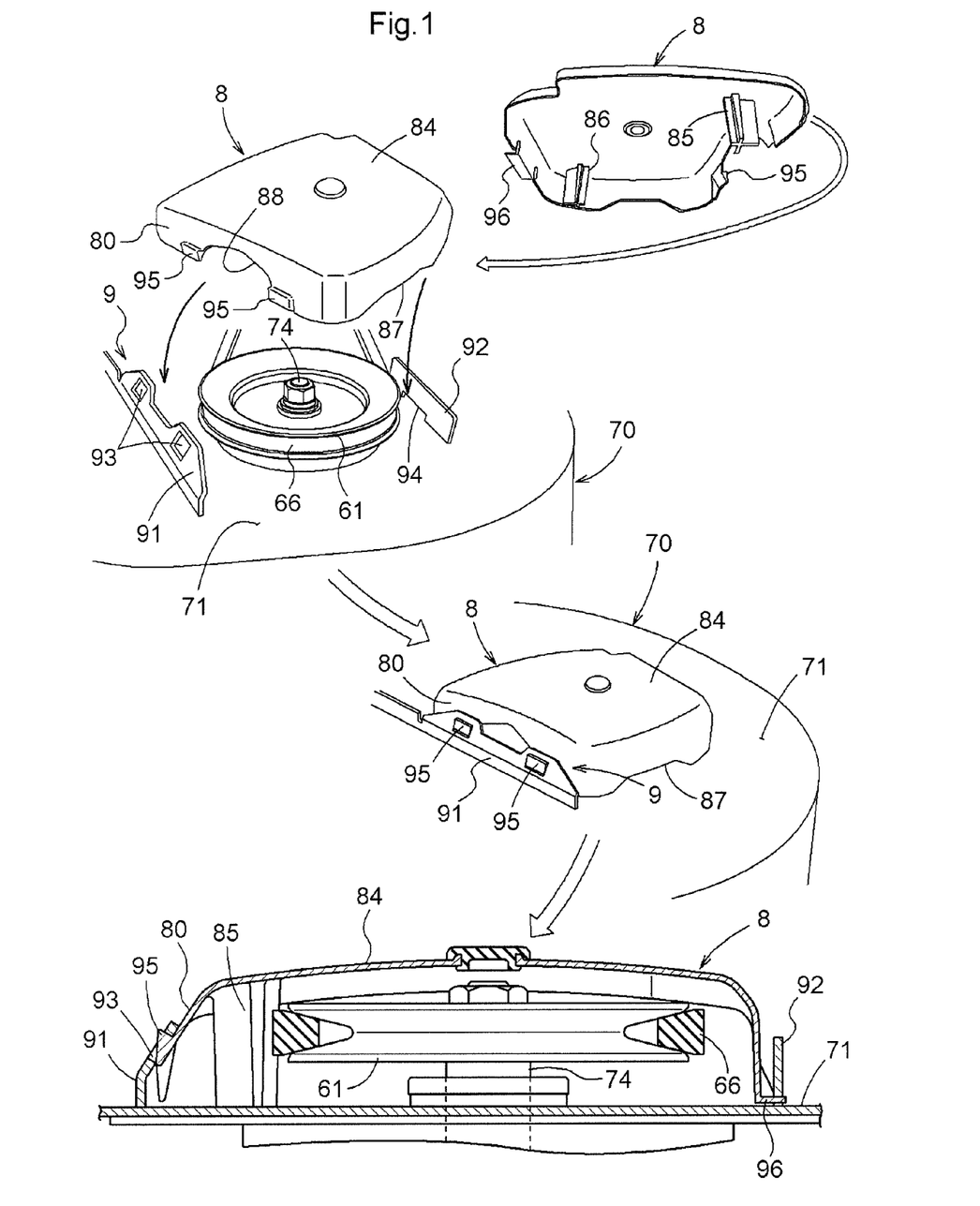
FIG. 1 is a schematic diagram illustrating a basic form of an attaching structure of a pulley cover in a mower unit according the present invention.

Before describing of a particular embodiment of a mower unit to be mounted to an engine-powered mower, according to the present invention, a basic form of a cover to be attached to a mower deck to cover a pulley for transmitting power to blades of the mower unit is described with reference to FIG. 1. In FIG. 1, a drive shaft 74 which transmits power to the blades (not illustrated) penetrates a top plate 71 of a mower deck 70, and a first pulley (hereinafter, it may simply be referred to as "the pulley" unless the pulley particularly needs to be distinguished from other pulleys) 61 to be belt-driven is attached at an upper end of the drive shaft 74. A first bracket 91 is provided forward of the pulley 61 on the top plate 71. A second bracket 92 is provided rearward of the pulley 61 on the top plate 71. Note that the terms "front" and "forward as used herein refer to front and forward with respect to a traveling direction of the mower body, and the terms "rear" and "rearward" as used herein refer to rear and rearward with respect to the traveling direction of the mower body. In addition, the terms "left" and "right" as used herein refer to width directions of the mower body.

In the example shown in FIG. 1, a first bracket 91 is a plate member extending in the left-and-right directions, and two first openings 93 are formed in the first bracket 91 at a height area away from the surface of the top plate 71. The second bracket 92 is also a plate member extending in the left-and-right directions, and a second opening 94 is formed in a lower end area of the second bracket 92.

The cover 8 has a square deep dish shape, and is comprised of an upper face part 84 and a side skirt 80 suspended from the perimeter of the upper face part 84. In the side skirt 80, two first projections 95 which engage with the first openings 93, and at least one second projection 96 which engages with the second opening 94, when attaching the cover, are formed. The first projections 95 and the first openings 93, and the second projection 96 and the second opening 94 are engaged with each other to function as a latch mechanism 9 for latch-connecting the cover 8 with the mower deck 70. When covering the pulley 61, the cover 8 is situated between the first bracket 91 and the second bracket 92 so as to cover that pulley 61, and, then, the first projections 95 enter into the first openings 93 using the elastic deformation of the cover 8, and the second projection 96 enters into the second opening 94. The attached state of the cover 8 to the mower deck 70 is maintained by the elastic force of the cover 8 itself.

Removal of the cover 8 from the mower deck 70 can be achieved, using the elastic deformation of the cover 8, by releasing the engagement of the first projections 95 from the first openings 93 and releasing the engagement of the second projection 96 from the second opening 94. In order to easily permit the elastic deformation of the cover 8 which causes displacements of the first projections 95 and the second projection 96, a notch 87 opened downwardly is formed in the side skirt 80. The notch, located outside in the left-and-right directions when the cover 8 is attached, functions as the notch 87 (see FIG. 1) for allowing a hand to be inserted into the cover 8. Moreover, a notch located between the two first projections 95 functions as a notch 88 (see to FIG. 1) for permitting easy displacements of the first projections 95, i.e., an easy deflection of an area around the first projections 95. Note that, although not clearly shown in FIG. 1, a notch which functions as an opening through which a belt 11 wound around the pulley 61 passes is also formed in the side skirt 80.

Post-shaped first rib 85 and second rib 86 extend downwardly from the back face of the upper face part 84 of the cover 8. The first rib 85 and the second rib 86 are arranged substantially on a diagonal line of the upper face part 84, and are separated from each other. The first rib 85 and the second rib 86 have lengths such that lower end surfaces thereof function as attaching surfaces which contact the surface of the top plate 71 of the mower deck 70 when the cover 8 is attached. In addition, the length of the side skirt 80 is determined so that a slight gap is formed between the side skirt 80 and the surface of the top plate 71 when the cover 8 is attached. Thus, by this gap, even when the first rib 85 and the second rib 86 contact the surface of the top plate 71, displacements of the first projections 95 and the second projection 96 are possible, thereby allowing an easy attachment and removal of the cover 8.

Although two first projections 95 and one second projection 96 are provided in the example of FIG. 1, only one first projection 95 or three or more first projections 95 may also be provided, while two or more second projections 96 may also be provided. The first opening(s) 93 and the second opening(s) 94 are preferably formed corresponding to the number of the first projection(s) 95 and the second projection(s) 96. In addition to the first rib 85 and the second rib 86, another rib may also be added, or only one of the first rib 85 and the second rib 86 may be provided.

Figure 2:
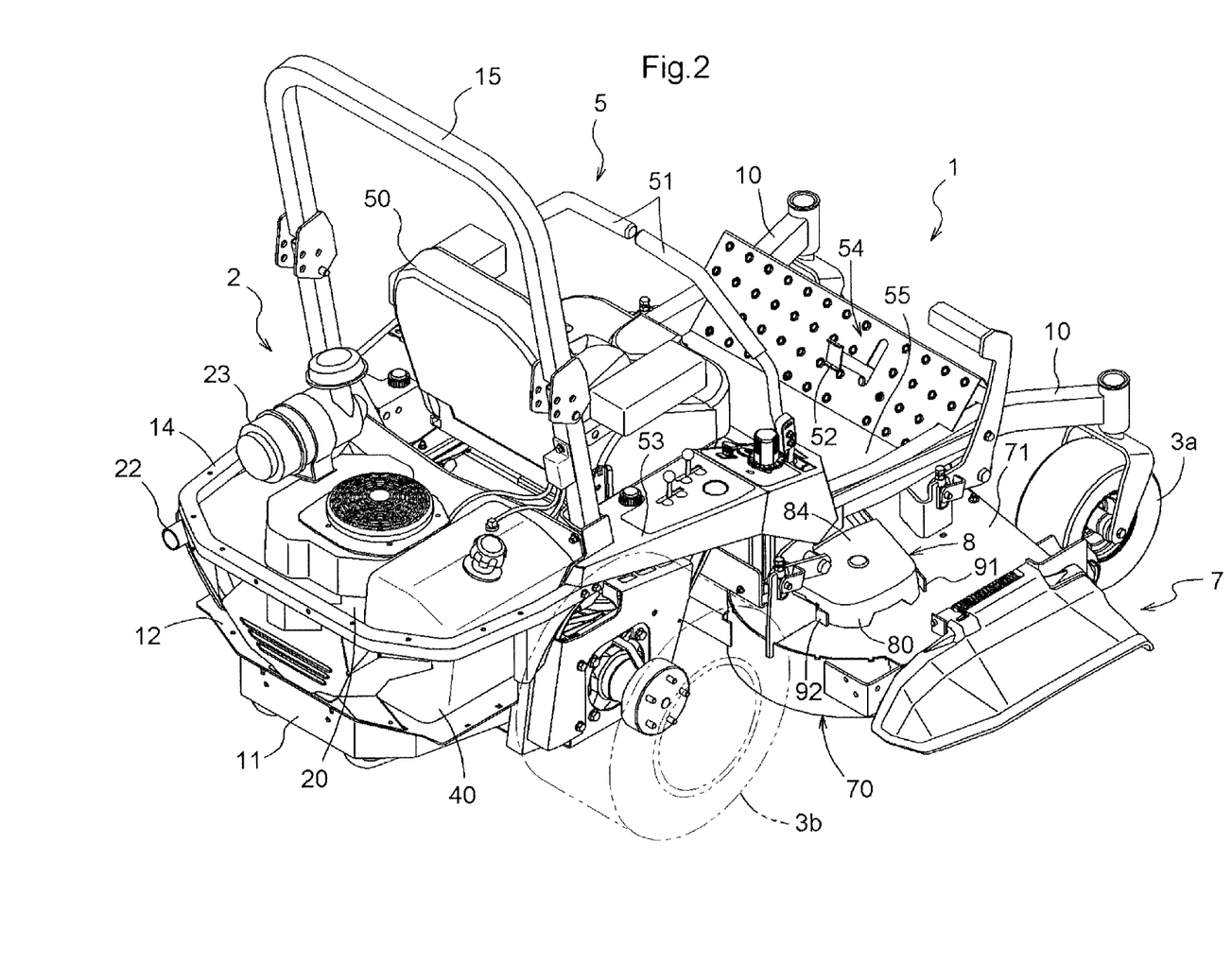
FIG. 2 is an entire external view of a zero-turn mower, showing an example embodiment of an engine-powered mower according to the present invention.

Hereinafter, a particular embodiment of the present invention is described with reference to the drawings. Here, a mower unit 7 according to the present invention is to be attached to the mower as shown in FIG. 2. This mower is a riding mower provided with a body 1 supported by a pair of left and right front wheels 3a and a pair of left and right rear wheels 3b. This riding mower is also referred to as a so-called "zero-turn mower" which is configured so that the left and right rear wheels 3b rotate independently in a normal direction and a reverse direction at any controlled speed.

The body 1 includes, as its main components, front frames 10 and a rear frame 11 which are made from, for example, pipes having a square cross section. Between the pair of left and right front wheels 3a and the pair of left and right rear wheels 3b, the mower unit 7 is suspended from the front frames 10 so as to move upward and downward via an elevating mechanism EM, as will be described in detail later. The elevating mechanism EM has a function to move the mower unit 7 upward and downward through a pedal or lever operation, while keeping the mower unit 7 horizontal.

A floor 55 made from a metal plate is attached to the front frames 10 to cover the front frames 10 substantially entirely from above. Although not illustrated in the figures, a mat made of rubber is placed over the floor 55. A footrest 54 having a slope is provided to the front end of the floor 55. An elevation control pedal 52, which allows an operator to lift and lower the mower unit 7 via the elevating mechanism EM, is arranged at the center of the slope of the footrest 54. A cockpit 5 is formed one step higher than and behind the floor 55, and an operator's seat 50 is provided at the center of the cockpit space. Fenders 53 and control levers 51 are provided on both left and right sides of the operator's seat 50. Note that various control levers, control buttons, and the like are arranged on the upper surface of the fenders 53. An arch-shaped ROPS (Rollover Protective Structure) 15 is provided standing behind the operator's seat 50. The ROPS 15 is made from a pipe having a square cross section. The drive system 2 including a gasoline engine 20 is provided in an area behind the ROPS 15 of the body 1.

The rear frame 11 has an arch shape in a plan view, and is comprised of a pair of left and right straight frame sections extending in the front-and-rear directions proximity to the rear wheels 3b, and a curved frame section having a rearward convex shape to connect the left and right straight frame sections. An area of the rear frame 11 behind the operator's seat 50 is defined as a substantially horizontal installation surface 12 which is a reference surface where various devices and instruments which constitute the power source including the engine 20 are installed. The installation surface 12 corresponds to an upper surface of a floor member attached on to the rear frame 11. A vertical frame 13 is provided standing from an upper part of the rear frame 11 so as to separate from a predetermined space from the upper part, and a cylindrical outer frame 14 having a square cross section and a shape similar to the contour of the rear frame 11 is attached to upper ends of the vertical frames 13.

First, the engine 20 is mounted near the center of the installation surface 12 in such a posture that its output shaft projects downwardly. A fuel tank 40 is placed over a space from an area in front of the engine 20 to an area rightward of the engine 20.

Figure 3:
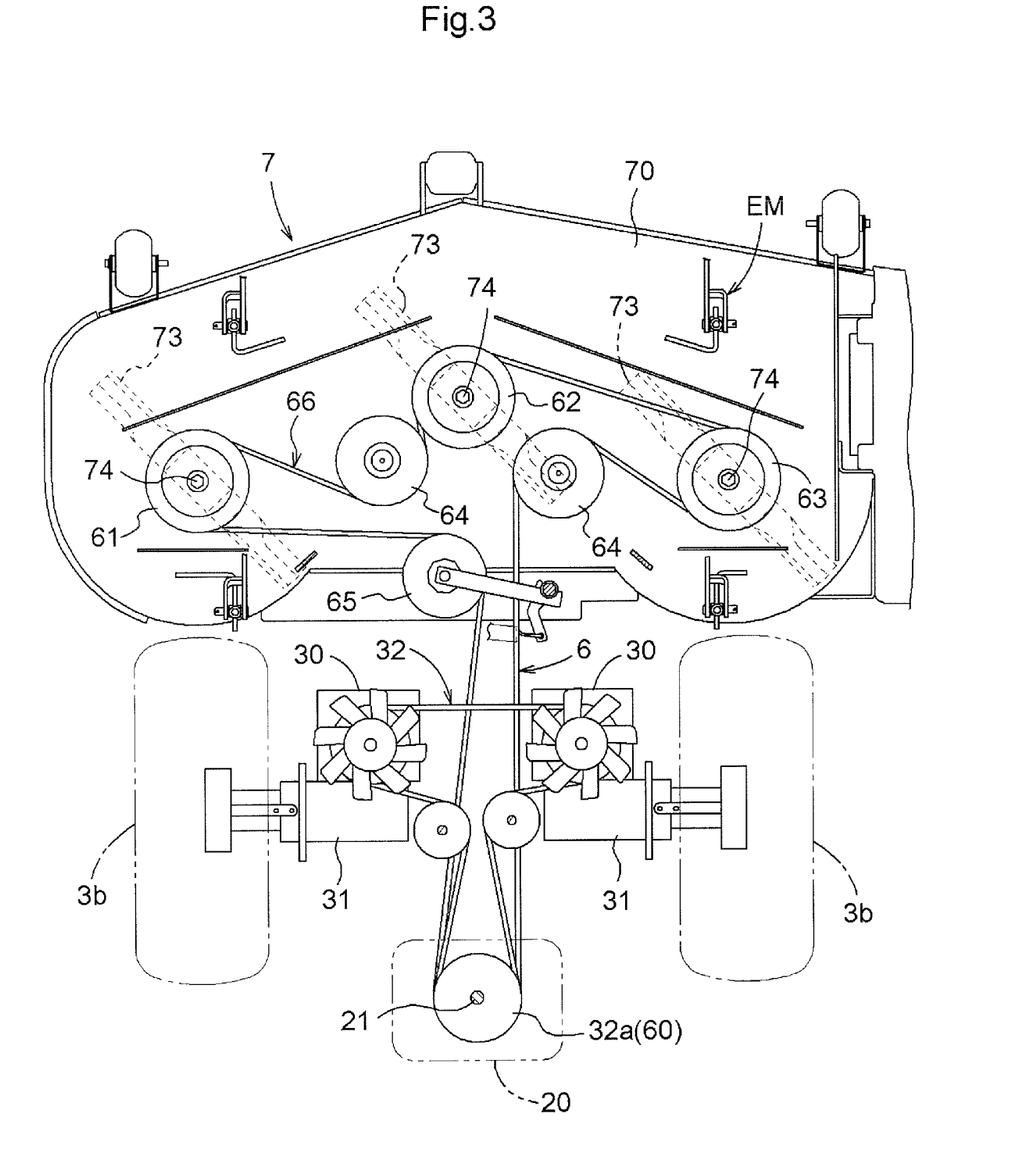
FIG. 3 is a power transmission system diagram of the zero-turn mower.

Although schematically shown in FIG. 3, an HST (Hydrostatic Transmission) 30 and a gear transmission mechanism 31 for transmitting a driving force to the rear wheel 3b are mounted corresponding to each of the left and right rear wheels 3b, respectively. Between the output shaft 21 of the engine 20 and the HSTs 30, a belt transmission mechanism 32 for propulsion is provided, and it transmits the engine output to the HSTs 30. A propulsion output pulley 32a which constitutes the belt transmission mechanism 32 for propulsion is provided to the output shaft 21. A gear change control shaft (not shown) of each HST 30 is associated with a corresponding one of the control levers 51 via an operation link mechanism, respectively, so that the gear position is controlled based on a pivoting operation of the control levers 51 in the front-and-rear directions, which is provided left and right and in immediately front of the operator's seat 50.

With this configuration, by pivoting the left and right control levers 51 in the front-and-rear directions, a shift operation of the HST 30 corresponding to the control lever 51 can be carried out, respectively, and the left and right rear wheels 3b can be driven while independently changing the gear position. That is, in this riding mower, the left and right front wheels 3a are steerably provided so as to follow the movement of the mower, and the left and right rear wheels 3b are provided so as to be independently driven while their gear positions can be changed. Therefore, any one of the following states can be presented: a stopping state where the left and right rear wheels 3b are stopped; a traveling state where the left and right rear wheels 3b are driven at a constant speed in a normal rotation or a reverse direction; a slow turning state where the left and right rear wheels 3b are driven at different speeds in the normal rotation or the reverse direction; a pivot turning state where either one of the left and right rear wheels 3b is stopped and the other rear wheel is driven in the normal rotation or the reverse direction; and a spin turning state where either one of the left and right rear wheels 3b is driven in the normal direction and the other rear wheel is driven in the reverse direction.

Figure 4:
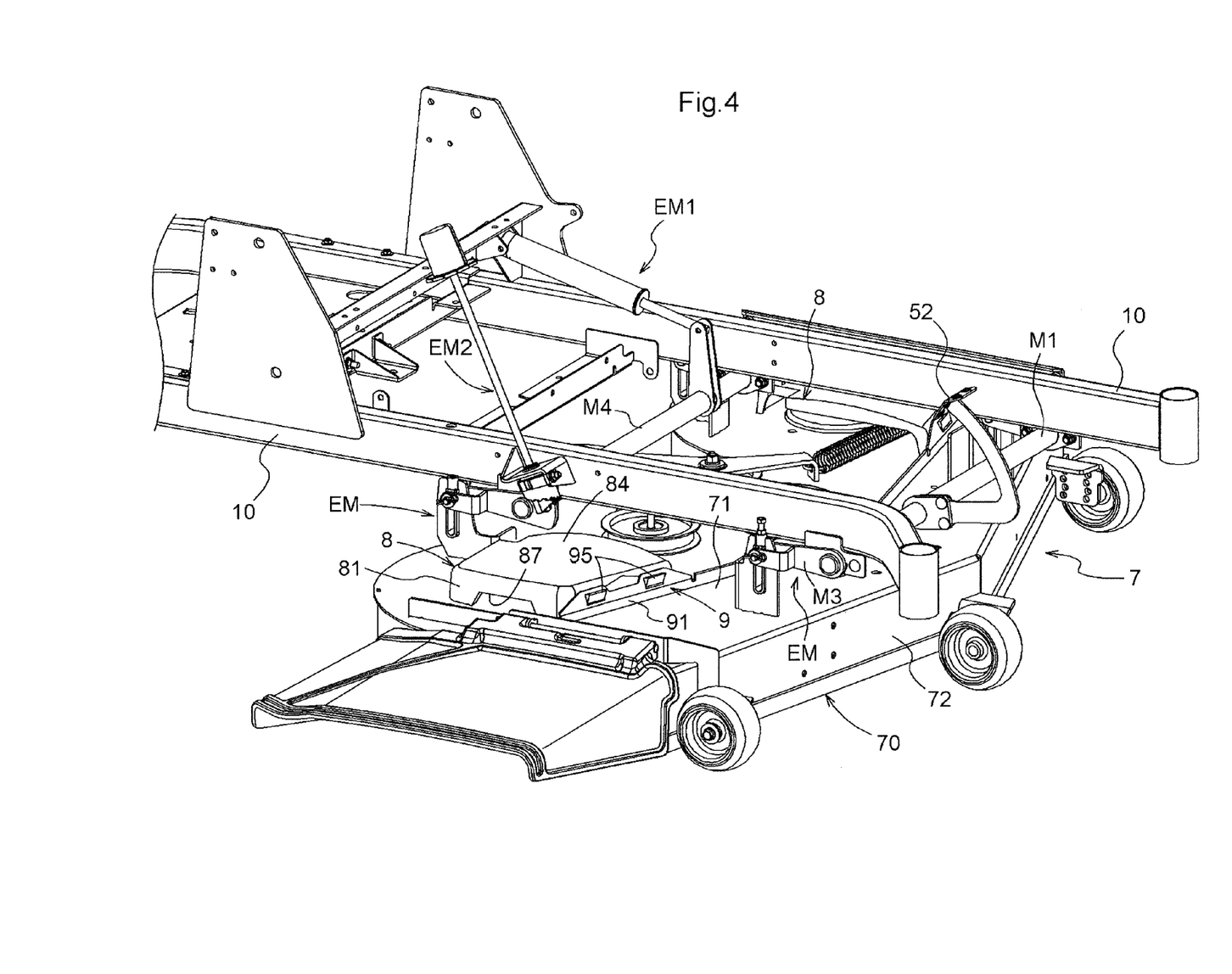
FIG. 4 is a perspective view showing a relation between a mower body and the mower unit.
Figure 5:
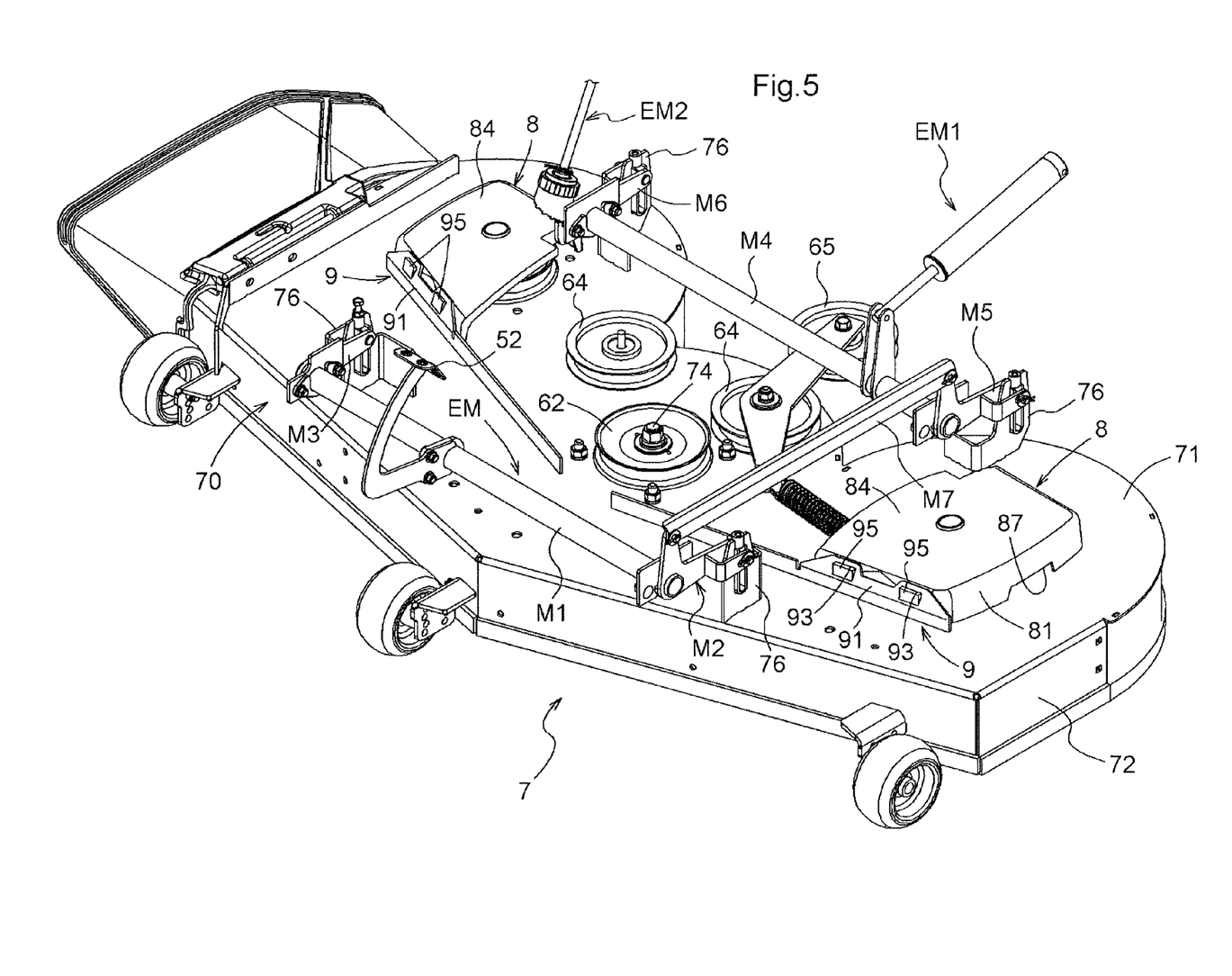
FIG. 5 is a perspective view of the mower unit.

As can be seen from FIGS. 1, 4, and 5, between the pair of left and right front wheels 3a and the pair of left and right rear wheels 3b, the mower unit 7 is suspended from the front frames 10 via the link-type elevating mechanism EM so as to move upwardly and downwardly. In an interior space formed by the top plate 71 and a side plate 72 of the mower deck 70 which constitutes the mower unit 7, three blades 73 are provided in a line in the transverse direction of the mower body, as schematically shown in FIG. 3. Each blade 73 is fixed to the drive shaft 74 which is supported by the top plate 71 of the mower deck 70 through bearings. In order to respectively transmit power from the output shaft 21 of the engine 20 to the drive shafts 74, a pulley type power transmission mechanism 6 is provided. This pulley type power transmission mechanism 6 is configured as a belt transmission mechanism, and a mower output pulley 60 is provided to the output shaft 21, below the propulsion output pulley 32a. That is, the belt transmission mechanism 32 for propulsion and the belt transmission mechanism 6 for the mower unit, of which an input shaft is the output shaft 21 of the engine 20, are arranged independently from each other, at different height levels. Thus, the power is transmitted to the mower unit 7 at a constant speed, regardless of a traveling speed and a traveling state.

The belt transmission mechanism 6 which transmits power to the mower unit 7 includes, in addition to the mower output pulley 60, a first pulley 61, a second pulley 62, and a third pulley 63, which are attached to parts of the three drive shafts 74 extending above the top plate 71, where the drive shafts 74 are arranged in the left-and-right directions. The mower unit 7 also includes two change-in-direction pulleys 64 and a tensioning pulley 65. A belt 66 is wound around these pulleys. As can be seen from FIGS. 2, 4, and 5, in order to increase a mowing width, a length of the mower unit 7 in the left-and-right directions is longer than a body width (a length of the body 1 in the left-and-right direction), and left and right ends of the mower unit 7 are projected outside the body 1. Thus, although the second pulley 62 located at the center is covered by the body 1 from above, the first pulley 61 and the third pulley 63 are exposed upwardly. For this reason, the first pulley 61 and the third pulley 63 are covered with the covers 8.

As shown in FIGS. 2, 4, and 5, the mower unit 7 is suspended movable upwardly and downwardly with respect to the front frames 10 by the elevating mechanism EM. A stroke adjusting mechanism EM1 for holding the mower unit 7 at an upper limit position is also provided.

The elevating mechanism EM is of a link type, and includes a first rotating shaft M1 extending in a front area of the mower unit 7, a first swing arm M2 and a second swing arm M3 which are coupled to both ends of the first rotating shaft M1, and a second rotating shaft M4 extending in a rear area of the mower unit 7, a third swing arm M5 and a fourth swing arm M6 which are coupled to both ends of the second rotating shaft M4, and a coupling bar M7 which couples the first swing arm M2 to the third swing arm M5.

The first rotating shaft M1 and the second rotation M4 are rotatably supported by the front frames 10. The first swing arm M2 has arm portions extending in two directions from the connecting point with the first rotating shaft M1, one arm portion is coupled to the mower deck 70 via a bracket 76, and the other arm portion is coupled to one end of the coupling bar M7. The third swing arm M5 has substantially the same shape as the first swing arm M2, one of arm portions is coupled to the mower deck 70 via a bracket 76, and the other arm portion is coupled to the other end of the coupling bar M7. The second swing arm M3 and the fourth swing arm M6 are single-link arms, one end of the second swing arm M3 is coupled to the first rotating shaft M1, and the other end is coupled to the mower deck 70 via a bracket 76. Similarly, one end of the fourth swing arm M6 is coupled to the second rotating shaft M4, and the other end is coupled to the mower deck 70 via a bracket 76. The four brackets 76 are provided standing at such positions in the top plate of the mower deck 70 that the mower deck 70 can be suspended and supported balanced. The elevation control pedal 52 is coupled to the first rotating shaft M1 so that the first rotating shaft M1 can be rotated by a depressing operation.

With such a configuration of the elevating mechanism EM, when an operator depresses the elevation control pedal 52, the first rotating shaft M1 rotates, the first swing arm M2 and the second swing arm M3 then rotate, and, then, the third swing arm M3 and the fourth swing arm M5 are rotated with the rotation of the second rotating shaft M4 via the coupling bar M7, thereby lifting the mower deck 70. In order to hold the mower unit 7 lifted at the maximum lifted position, the stroke adjusting mechanism EM1 is used. Although detailed description of the stroke adjusting mechanism EM1 is omitted, it has a function to allow a descent of the mower deck 70 by its own weight located at the maximum lifted position by depressing the elevation control pedal 52 twice, and, further, to lock the mower unit 7 at the maximum lifted position by again depressing the elevation control pedal 52 to lift the mower deck 70 to the maximum lifted position. In order to limit the descending amount of the mower unit 7 by its own weight and to obtain a desired mowing height, a lower limit setting mechanism EM2 is provided. Since this lower limit setting mechanism EM2 itself is well known, description thereof is omitted herein. The lower limit setting mechanism EM2 includes multi-stage contact surfaces with different heights, and a contact body which contacts on of the contact surfaces selected using a selection operator interface. For a more detailed understanding, U.S. Pat. No. 6,122,903 and U.S. Pat. No. 7,770,370 described above may be referred.

Figure 6:
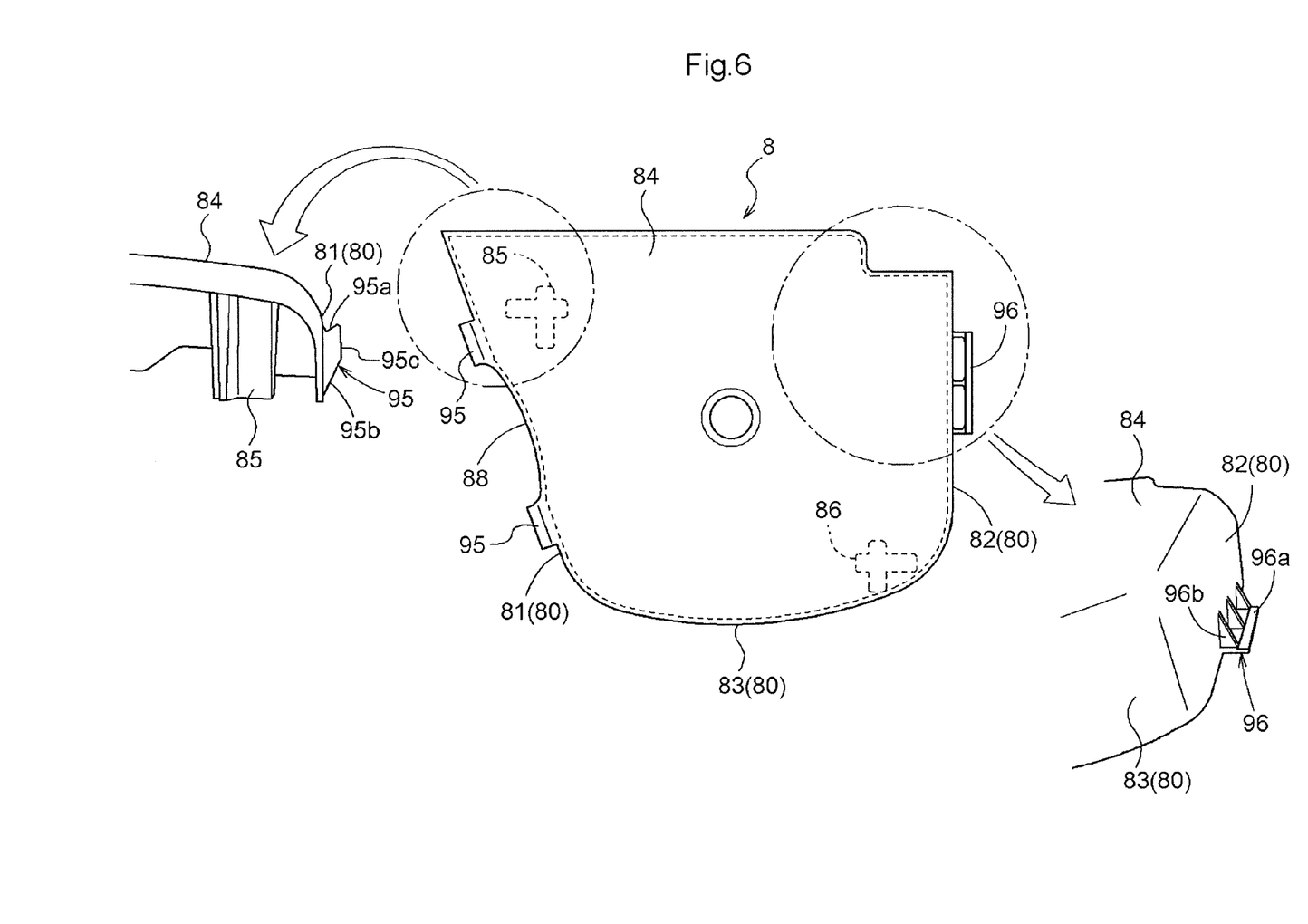
FIG. 6 is a plan view including partially enlarged stereogram of the cover which covers the pulley of the mower unit.
Figure 7:
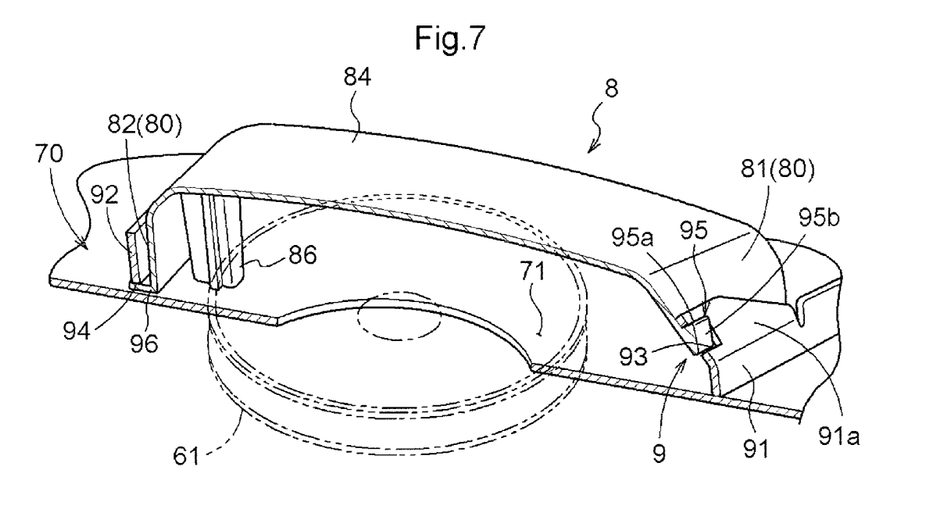
FIG. 7 is a cross-sectional view of the cover.
Figure 8:
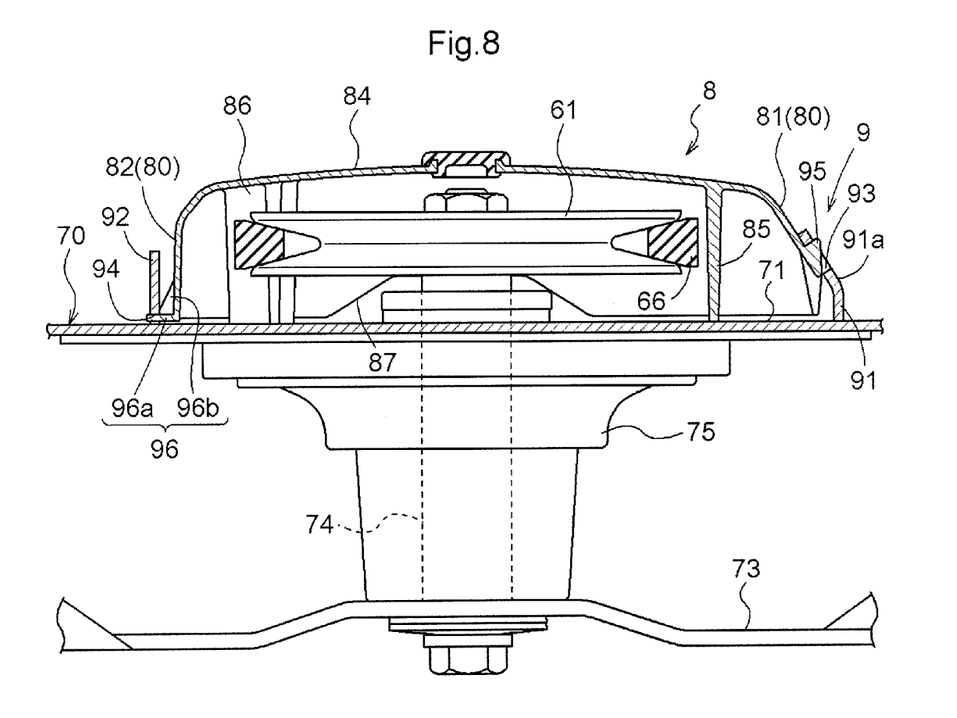
FIG. 8 is a cross-sectional view showing the cover, a drive shaft, and blades.

Next, with reference to FIGS. 6, 7, and 8, a structure of the cover 8 which is detachably attached to the top plate 71 of the mower deck 70 to cover the first pulley 61 or the third pulley 63, as well as a latch mechanism 9 of the cover 8, are described. The first bracket 91 and the second bracket 92 having similar shapes as those schematically shown in FIG. 1 are fixed by welding or the like to the top plate 71 of the mower deck 70 which is a base for attaching the cover 8 to the mower deck 70. The first bracket 91 and the second bracket 92 are arranged so as to be spaced apart from each other in the front-and-rear directions so that they sandwich the first pulley 61 or the third pulley 63 therebetween.

The cover 8 has a trapezoidal flat bottom dish shape, and for easier description of the cover 8 which is comprised of the upper face part 84 as a ceiling, and the side skirt 80 as a peripheral wall, a front part of the side skirt 80 is referred to as a first skirt portion 81, and a rear part as a second skirt portion 82, and an outside side part as a third skirt portion 83. An inside side portion of the side skirt 80 is greatly notched in order to allow the belt 66 to pass therethrough. The first rib 85 and the second rib 86 extending downwardly from the upper face part 84 are provided in the cover 8. The first rib 85 and the second rib 86 are post bodies having cross shapes in cross section, and outer ends serve as the attaching surfaces to the top plate 71 of the mower deck 70. The first rib 85 and the second rib 86 are arranged separate from each other on a diagonal line.

In order to detachably attach the cover 8 to the mower deck 70 without any tools, the latch mechanism 9 is established between the mower deck 70 and the cover 8. In this embodiment, elements of the latch mechanism 9 on the mower deck 70 side include the two first openings 93 formed in the first bracket 91, and the single second opening 94 formed in the lower end area of the second bracket 92. The first openings 93 located at the predetermined height from the surface of the top plate 71 are square holes. In detail, the second opening 94 is a slot-shaped hole defined by the square notch formed at the lower end of the second bracket 92, and the surface of the top plate 71, and the second opening 94 has a greater width in the left-and-right directions compared with the first opening 93. Elements of the latch mechanism 9 on the cover 8 side include the two first projections 95 provided to the first skirt portion 81, and the single second projection 96 provided to the second skirt portion 82. The first projections 95 are arranged so as to engage with the first openings 93 when attaching the cover, and the second projection 96 is arranged so as to engage with the second opening 94 when attaching the cover.

As is clear from FIG. 6, the first projections 95 is comprised of a fit-in recessed portion 95a having a triangular groove shape formed in its upper part and opened upwardly, an inclined portion 95b formed in its lower part, and a transition portion 95c which connects the fit-in recessed portion 95a and the inclined portion 95b. As can be seen from FIGS. 7 and 8, using the deflections of the upper face part 84 and the side skirt 80, the first projections 95 enter into the first openings 93 so that the fit-in recessed portions 95a are latched to upper edges of the first openings 93. Note that, in order to facilitate the insertion of the first projections 95 into the first openings 93, the first bracket 91 is formed as an inclined part 91a of which the upper half is inclined toward the cover 8.

The second projection 96 is a projection which is formed by a part of the lower end of the second skirt portion 82 bending outwardly in the horizontal direction, and triangular ribs 96b are formed for reinforcement in an upper surface of the bending-out portion. Thus, the second projection 96 forms, at its tip-end side, a planer tongue-shaped piece 96a having a rectangular parallelepiped shape in a plan view (when seen from a normal direction of the top plate 71). This planer tongue-shaped piece 96a enters into the second opening 94. When attaching the cover 8 to the mower deck 70, the second projection 96 is first inserted into the second opening 94 and, then, the first projections 95 are latched to the first openings 93 using the deflection.

As is clear from FIG. 8 which shows a state where the cover 8 is latch mounted to the top plate 71 of the mower deck 70, the lower end surfaces of the first rib 85 and the second rib 86 extend to positions lower than the lower end surface of the side skirt 80 of the cover 8. Thus, when attached, the slight gap exists between the lower end surface of the side skirt 80 and the surface of the top plate 71 in the state where the lower end surfaces of the first rib 85 and the second rib 86 are contacting to the top plate 71. This gap allows slightly but freely the downward displacements of the first projection 95 and the second projection 96, and thereby facilitating the attachment and detachment of the cover 8 to/from the mower deck 70. Moreover, when a downward force acts on the top plate 71 from above, for example, by one unintentionally stepping thereon, the force is received by the first rib 85 and the second rib 86. In addition, displacements of the first projections 95 and the second projection 96 which may sometimes be caused by the force will be displacements which urge the projections into the first openings 93 and the second opening 94 so that it functions to strengthen the latching action of the cover 8 to the mower deck 70.

(1) The shape of the cover 8 itself may adopt various shapes including a dome shape, a rectangular parallelepiped shape, a circular cylinder shape, and a polygon pillar shape. In the present invention, the shape is not particularly limited as long as the cover 8 is a member where the first projection(s) 95 and the second projection(s) 96 are provided to the side face thereof.

(2) In the above embodiment, although the mower unit 7 to which the cover 8 is attached is suspended between the front wheels 3*a* and the rear wheels 3*b*, it may be suspended in front of the front wheels 3*a*, or may be suspended behind the rear wheels 3*b*.

(3) The arranged positions of the first bracket 91 and the second bracket 92 may be interchanged. In this case, the arranged positions of the first projection(s) 95 and the second projection(s) 96 are also interchanged.

(4) In the above embodiment, although the first bracket 91 has a bent cross section and the second bracket 92 has a rectangular cross section, the first bracket 91 may have the rectangular cross section and the second bracket 92 may have the bent cross section. Alternatively, both may have the bent cross sections or both may have the rectangular cross sections.

(5) The shapes of the first bracket 91 and the second bracket 92 may also use members having other various profiles, without limiting to the strap-shaped member or the angle member.

(6) The shapes of the first projection(s) 95 and the second projection(s) 96 may be modified variously, and the shapes of the first opening(s) 93 and the second opening(s) 94 formed in the first bracket 91 and the second bracket 92, respectively, may also be modified accordingly.

(7) As the material of the cover 8, various materials including steel, a light alloy, a synthetic resin, and a composite material are available as long as the deflection required for the latch action can be secured.

What is claimed is:

1. A mower unit to be attached to an engine-powered mower, comprising:
    a rotary blade;
    a mower deck covering the rotary blade;
    a drive shaft penetrating a top plate of the mower deck, the drive shaft having a lower part located below the top plate and an upper part located above the top plate, the rotary blade is attached to the lower part;
    a pulley type power transmission device for transmitting power from an engine to the drive shaft, the pulley type power transmission device including a pulley attached to the upper part of the drive shaft;
    a cover having a side skirt and an upper face part, covering the pulley; and
    a latch mechanism for removably attaching the cover onto the top plate of the mower deck using an elastic deformation of the upper face part of the cover, the latch mechanism including:
        a first bracket provided to the top plate and formed with at least one first opening;
        a second bracket provided to the top plate so as to oppose the first bracket via the pulley and formed with at least one second opening;
        at least one first projection provided to the side skirt of the cover, and for engaging with the first opening when attaching the cover; and
        at least one second projection provided to the side skirt of the cover, and for engaging with the second opening when attaching the cover.

2. The mower unit of claim 1, wherein a first rib and a second rib are formed extending downwardly from the upper face part of the cover, and lower end surfaces of the first rib and the second rib function as attaching surfaces that contact the surface of the top plate when the cover is attached, and said first and second ribs are each arranged closer to the side skirt than to each other.

3. The mower unit of claim 1, wherein the upper face part of the cover has a plate shape, and using an elastic deformation of the upper face part of the cover, the first projection enters into the first opening from a surface of the first bracket on the pulley side, and the second projection enters into the second opening from a surface of the second bracket on the pulley side.

4. The mower unit of claim 3, wherein the elastic deformation of the upper face part of the cover due to a downward load acting on the upper face part of the cover further causes a displacement of the first projection so that the first projection enters into the first opening, and further causes a displacement of the second projection so that the second projection enters into the second opening.

5. The mower unit of claim 4, wherein the first projection is formed as a hook-like engaging pawl, and the second projection is formed as an planer tongue-shaped piece extending horizontally.

6. The mower unit of claim 1, wherein the first opening is formed in an intermediate area of the side skirt in a height direction, and at least a periphery portion of the first bracket around the first opening inclines toward the pulley side.

7. The mower unit of claim 1, wherein an access notch opened downwardly is formed in the side skirt of the cover, and the notch allows a hand to access into the cover.

8. The mower unit of claim 1, wherein the first projection is provided as a left side first projection, and another first projection is provided as a right side first projection that is spaced apart from the left side projection, and a deflection notch is formed between the left side first projection and the right side first projection.

9. The mower unit of claim 1, wherein the first projection and the second projection are provided at opposite portions of the skirt.

10. The mower unit of claim 1, wherein said side skirt of the cover comprises a notch structured and arranged to permit elastic deformation of the cover.

11. The mower unit of claim 1, wherein the cover is deformable by a force acting from above such that when the upper face part deflects downwardly the side skirt is caused to widen.

12. A mower unit to be attached to an engine-powered mower, comprising:
    a rotary blade;
    a mower deck covering the rotary blade;
    a drive shaft penetrating a top plate of the mower deck, the drive shaft having a lower part located below the top plate and an upper part located above the top plate, the rotary blade being attached to the lower part;
    a pulley type power transmission device for transmitting power from an engine to the drive shaft, the pulley type power transmission device including a pulley attached to the upper part of the drive shaft;
    a cover comprising a side skirt and an upper face part, and being releasably attachable to the top plate of the mover deck;
    said upper face part comprising first and second ribs extending downwardly and being spaced inwardly from the side skirt; and
    said side skirt of the cover comprising;
        at least one first projection releasably engagable with an opening of a first bracket arranged on the top plate;

at least one second projection releasably engagable with an opening of a second bracket arranged on the top plate, wherein the cover deflects during installation of the cover onto the top plate of the mower deck.

13. The mower unit of claim 12, wherein the upper face part is deflectable by a force acting from above and the first and second ribs function to suppress deflection of the upper face part.

14. The mower unit of claim 12, wherein the upper face part is deflectable and the first and second ribs have lower ends structured and arranged to contact the top plate during attachment of the cover.

15. The mower unit of claim 12, wherein the first and second ribs have lower ends structured and arranged to contact the top plate during attachment of the cover.

16. The mower unit of claim 15, wherein the first and second ribs are diagonally arranged and are integrally formed with the cover.

17. The mower unit of claim 12, wherein the side skirt is deflectable and comprises a notch structured and arranged to permit elastic deformation of the cover so that the cover can be removed.

18. A mower unit to be attached to an engine-powered mower, comprising:
- a rotary blade;
- a mower deck covering the rotary blade;
- a drive shaft penetrating a top plate of the mower deck, the drive shaft having a lower part located below the top plate and an upper part located above the top plate, the rotary blade being attached to the lower part;
- a pulley type power transmission device for transmitting power from an engine to the drive shaft, the pulley type power transmission device including a pulley attached to the upper part of the drive shaft;
- a cover comprising a side skirt and an upper face part and being releasably attachable to the top plate of the mover deck;
- said side skirt of the cover comprising;
    - a notch structured and arranged to permit elastic deformation of the cover so that the cover can be removed;
    - at least one first projection releasably engagable with an opening of a first bracket arranged on the top plate;
    - at least one second projection releasably engagable with an opening of a second bracket arranged on the top plate, wherein the upper face part is deflectable during installation of the cover onto the top plate of the mower deck.

19. The mower unit of claim 18, further comprising first and second spaced apart ribs extending downwardly from the upper face part and being spaced inwardly from the side skirt.

20. The mower unit of claim 18, wherein the first and second ribs have lower ends structured and arranged to contact the top plate during attachment of the cover during movement of the at least one first and second projections.

* * * * *